(12) United States Patent
Matthews et al.

(10) Patent No.: US 11,196,357 B1
(45) Date of Patent: Dec. 7, 2021

(54) FULLY INTEGRATED TRIBOELECTRIC ENERGY HARVESTING SYSTEM

(71) Applicant: Uncharted Power, Inc., Poughkeepsie, NY (US)

(72) Inventors: Jessica Osemudiamen Idoni Matthews, New York, NY (US); James Korge, Coral Gables, FL (US)

( * ) Notice: Subject to any disclaimer, the term of this patent is extended or adjusted under 35 U.S.C. 154(b) by 729 days.

(21) Appl. No.: 15/691,350

(22) Filed: Aug. 30, 2017

Related U.S. Application Data

(60) Provisional application No. 62/483,282, filed on Apr. 7, 2017, provisional application No. 62/381,297, filed on Aug. 30, 2016.

(51) Int. Cl.
| | |
|---|---|
| *H02J 7/00* | (2006.01) |
| *H02N 1/04* | (2006.01) |
| *F03G 5/06* | (2006.01) |
| *H02M 3/158* | (2006.01) |

(52) U.S. Cl.
CPC ............... *H02N 1/04* (2013.01); *F03G 5/06* (2013.01); *H02J 7/0068* (2013.01); *H02M 3/158* (2013.01)

(58) Field of Classification Search
CPC .... H02M 3/156; H02M 3/158; H02M 3/1588; H02M 3/155; H02M 3/1582; H02M 3/157; H02M 3/1563; H02M 3/1584; H02M 1/32; H02M 1/081–084; H02M 2003/1566; H02M 2003/1557; H02M 2001/0012; H02M 2001/0009; H02M 2001/385; H04B 2215/069; H02N 2/186; H02N 2/18; H02N 1/04; H02N 1/002; H02N 11/002; G05B 15/02; G05B 13/024
See application file for complete search history.

(56) References Cited

U.S. PATENT DOCUMENTS

| | | | |
|---|---|---|---|
| 7,336,054 B2 | 2/2008 | Crisp et al. | |
| 2004/0075408 A1 | 4/2004 | Gorti et al. | |
| 2004/0113589 A1 | 6/2004 | Crisp et al. | |
| 2008/0143292 A1 | 6/2008 | Ward et al. | |
| 2008/0203966 A1 | 8/2008 | Ward et al. | |
| 2010/0289447 A1 | 11/2010 | Dobson et al. | |
| 2011/0089904 A1 | 4/2011 | Ward et al. | |
| 2012/0043818 A1* | 2/2012 | Stratakos | H02M 3/158 307/77 |
| 2013/0049531 A1 | 2/2013 | Wang et al. | |
| 2013/0263393 A1* | 10/2013 | Mazumder | H01L 31/0543 15/1.51 |
| 2014/0084748 A1 | 3/2014 | Wang et al. | |
| 2014/0246950 A1 | 9/2014 | Wang et al. | |

(Continued)

OTHER PUBLICATIONS

Chen et al. Micro-cable structured textile for simultaneously harvesting solar and mechanical energy. Nature Energy; vol. 1, Article No. 16138; Published: Sep. 12, 2016. 8 pages.

(Continued)

*Primary Examiner* — Bryan R Perez
(74) *Attorney, Agent, or Firm* — Schoeman Updike Kaufman & Gerber LLP; Jeong Eun Lee-Nago; Rita H. Lin

(57) ABSTRACT

A fully integrated triboelectric energy harvesting system can comprise a triboelectric generator, an electrical energy harvesting system, and a power amalgamation circuit. The triboelectric generator can comprise triboelectric materials, conductive contacts, and a mechanical motion transformer.

20 Claims, 4 Drawing Sheets

(56) References Cited

U.S. PATENT DOCUMENTS

| | | |
|---|---|---|
| 2014/0246951 A1 | 9/2014 | Wang et al. |
| 2014/0292138 A1 | 10/2014 | Wang et al. |
| 2014/0300248 A1 | 10/2014 | Wang et al. |
| 2014/0338458 A1 | 11/2014 | Wang et al. |
| 2016/0105538 A1* | 4/2016 | Olah .................. H02J 7/34 455/573 |
| 2016/0149518 A1 | 5/2016 | Wang et al. |
| 2016/0344308 A1 | 11/2016 | Wang et al. |

OTHER PUBLICATIONS

Co-pending U.S. Appl. No. 15/691,690, filed Aug. 30, 2017.
U.S. Appl. No. 15/691,690 Office Action dated Oct. 19, 2018.

* cited by examiner

FULLY INTEGRATED TRIBOELECTRIC ENERGY HARVESTING SYSTEM

CROSS-REFERENCE

This application claims the benefit of U.S. Provisional Application No. 62/381,297, filed Aug. 30, 2016, and U.S. Provisional Application No. 62/483,282, filed Apr. 7, 2017, which applications are entirely incorporated herein by reference.

BACKGROUND

Triboelectric effects can be used to accumulate energy or to power devices. The polarity and strength of the charges produced, however, may differ according to the materials, surface roughness, temperature, and various other properties. Therefore, electricity that can be generated via triboelectric effects may not be very predictable, and thus the output electricity may not be useful or applicable in practice.

SUMMARY

Recognized herein is a need to efficiently and effectively combine output power from two or more triboelectric energy harvesting units or devices. An integrated triboelectric energy system may aggregate power generated from a plurality of individual modular triboelectric energy harvesting units. A modular interconnection of the plurality of individual triboelectric energy harvesting units may be accumulated to produce a single larger power output, which may be more practical for use in various electrical needs compared to smaller, and distributed, power outputs.

The systems, circuits, and related methods described herein can harvest and accumulate energy from triboelectric materials and conductive contacts, which may be affixed to the triboelectrically active materials, to store energy or power various devices. For example, a triboelectric energy harvesting unit can be integrated in a wearable device. Beneficially, the triboelectric energy harvesting unit can power the wearable device, obviating the need to rely on batteries or other energy cells (e.g., electrochemical cells) that must be periodically recharged, such as by connecting to a power outlet or electrical grid.

The integrated triboelectric energy system may be portable. The integrated triboelectric energy system may be capable of delivering, on demand, and in real-time, electrical energy to power various devices, including the integrated device and/or one or more external devices electrically communicating with the integrated device.

The systems and methods described herein may enable the harvesting of energy by engaging triboelectically active materials through motion—translational and/or rotational—incurred in response to a pressure exerted. The pressure can be exerted by human action or other kinetic forces. These materials may harvest the energy through the process of contact electrification, wherein the two materials, with different ratings on the triboelectric series, may come into contact during the point of maximum displacement and subsequently separate as the materials return to their original positions. During contact, charges may redistribute across the surfaces in contact; after separation, the surfaces can retain a net charge corresponding to the aforementioned redistribution. This separation of charges can establish an electric potential which can then be used to drive current through useful electronics via conductive contacts affixed to the triboelectrically active materials.

The disclosed system and methods may have various benefits. For example, a mechanical motion transformer described herein may directly or indirectly engage a triboelectric generator with one or more input motions. The mechanical motion transformer may be configured to engage the triboelectric materials according to various motions in order to produce a useful electric potential, and return the same materials to their original position. Such configuration may reliably capture and/or filter motions necessary for harvesting energy. Moreover, the disclosed systems and methods describe a fully integrated triboelectric energy harvesting system which may be configured to receive some motion as an input, and transfer the motion to a set of triboelectric materials. As a result of such motion, the system may be configured to produce a useful electric potential which may further drive an energy harvesting circuit. The energy harvesting circuit may be connected to a power amalgamation circuit. The power amalgamation circuit may drive useful electronics or aid in storing energy.

The disclosed systems and methods can enable combinations of several triboelectric generators, thereby combining their power outputs into one, larger, and more useful power output.

In an aspect, provided is a triboelectric energy harvesting system, comprising: one or more triboelectric generators, each triboelectric generator comprising: a first triboelectric material and a second triboelectric material configured to (i) at a first state, be electrically isolated from the other, and (ii) at a second state, be in frictional contact with the other; a first conductive contact electrically coupled to the first triboelectric material and a second conductive contact electrically coupled to the second triboelectric material, wherein the first conductive contact and the second conductive contact are each electrically coupled to a battery charging circuit; a mechanical motion transformer configured to, upon receipt or release of an input force, alternate to the second state from the first state or alternate to the first state from the second state, respectively; and an energy storage system electrically coupled to the battery charging circuit, wherein the energy storage system is capable of collecting outputs from the triboelectric generator; and a power amalgamation circuit comprising a plurality of inputs and an output, wherein the plurality of inputs is connected to the respective battery charging circuit of each triboelectric generator, and wherein the output is configured to combine the power from the plurality of inputs.

In some embodiments, the first triboelectric material and the second triboelectric material are selected from the group consisting of PTFE, PDMS, PMMA, PVC, FEP, Kapton, Acrylic, Metals, Conductive polymers, and Indium Tin Oxide, wherein the first triboelectric material is distinct from the second triboelectric material.

In some embodiments, the first conductive contact and the second conductive contact is selected from the group consisting of one or more metals, conductive polymers, Indium Tin Oxide, and other semi-conductive materials.

In some embodiments, the energy storage system is electrically connected to one or more of a rectifier and a DC to DC converter. The DC to DC converter can be a buck converter or a buck-boost converter.

In some embodiments, the frictional contact results from shear interaction of the first triboelectric material and the second triboelectric material.

In some embodiments, the frictional contact between the first triboelectric material and the second triboelectric material results from one or more of a compressive, tensing, torsional, sliding, rubbing and stretching force.

In some embodiments, the triboelectric energy generating system further comprises an electronic device electrically coupled to the power amalgamation circuit and powered by the combined power. In some embodiments, the electronic device is a wearable device, and wherein the input force is provided by a human wearing the wearable device.

In some embodiments, the input force is provided by a human.

In some embodiments, at least two of the respective battery charging circuit of each triboelectric generator produces different voltage outputs.

In another aspect, provided is a method for harvesting triboelectric energy from a plurality of triboelectric generators, comprising: integrating a plurality of triboelectric generators into different locations of a device, wherein a given triboelectric generator of the plurality of triboelectric generator comprises a battery charging circuit; providing an input force to one or more triboelectric generators from the plurality of triboelectric generators; upon receipt of the input force, generating, in each of the one or more triboelectric generators, a first pulse of power output at the battery charging circuit of each of the one or more triboelectric generators; and combining each first pulse of power output, via a power amalgamation circuit, into a first combined output.

In some embodiments, the given triboelectric generator further comprises: a first triboelectric material and a second triboelectric material configured to (i) at a first state, be electrically isolated from the other, and (ii) at a second state, be in frictional contact with the other; a first conductive contact electrically coupled to the first triboelectric material and a second conductive contact electrically coupled to the second triboelectric material, wherein the first conductive contact and the second conductive contact are each electrically coupled to the battery charging circuit; and a mechanical motion transformer configured to, upon receipt or release of the input force, alternate to the second state from the first state or alternate to the first state from the second state, respectively.

In some embodiments, the first triboelectric material and the second triboelectric material are selected from the group consisting of PTFE, PDMS, PMMA, PVC, FEP, Kapton, Acrylic, Metals, Conductive polymers, and Indium Tin Oxide.

In some embodiments, the first conductive contact and the second conductive contact are selected from the group consisting of one or more metals, conductive polymers, Indium Tin Oxide, and other semi-conductive materials.

In some embodiments, the battery charging circuit comprises one or more of a rectifier and a DC to DC converter. The DC to DC converter can be a buck converter or buck-boost converter.

In some embodiments, the method further comprises powering an electronic device electrically coupled to the power amalgamation circuit. In some embodiments, the electronic device is the device.

In some embodiments, the method further comprises releasing the input force from the one or more triboelectric generators; upon release of the input force, generating, in each of the one or more triboelectric generators, a second pulse of power output at the battery charging circuit of each of the one or more triboelectric generators; and combining each second pulse of power output, via the power amalgamation circuit, into a second combined output.

In some embodiments, the method further comprises storing the first combined output and the second combined output in an energy storage system electrically coupled to the power amalgamation circuit. In some embodiments, the energy storage system is a battery.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and descriptions are to be regarded as illustrative in nature, and not as restrictive.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein) of which:

DETAILED DESCRIPTION

Figure 1:
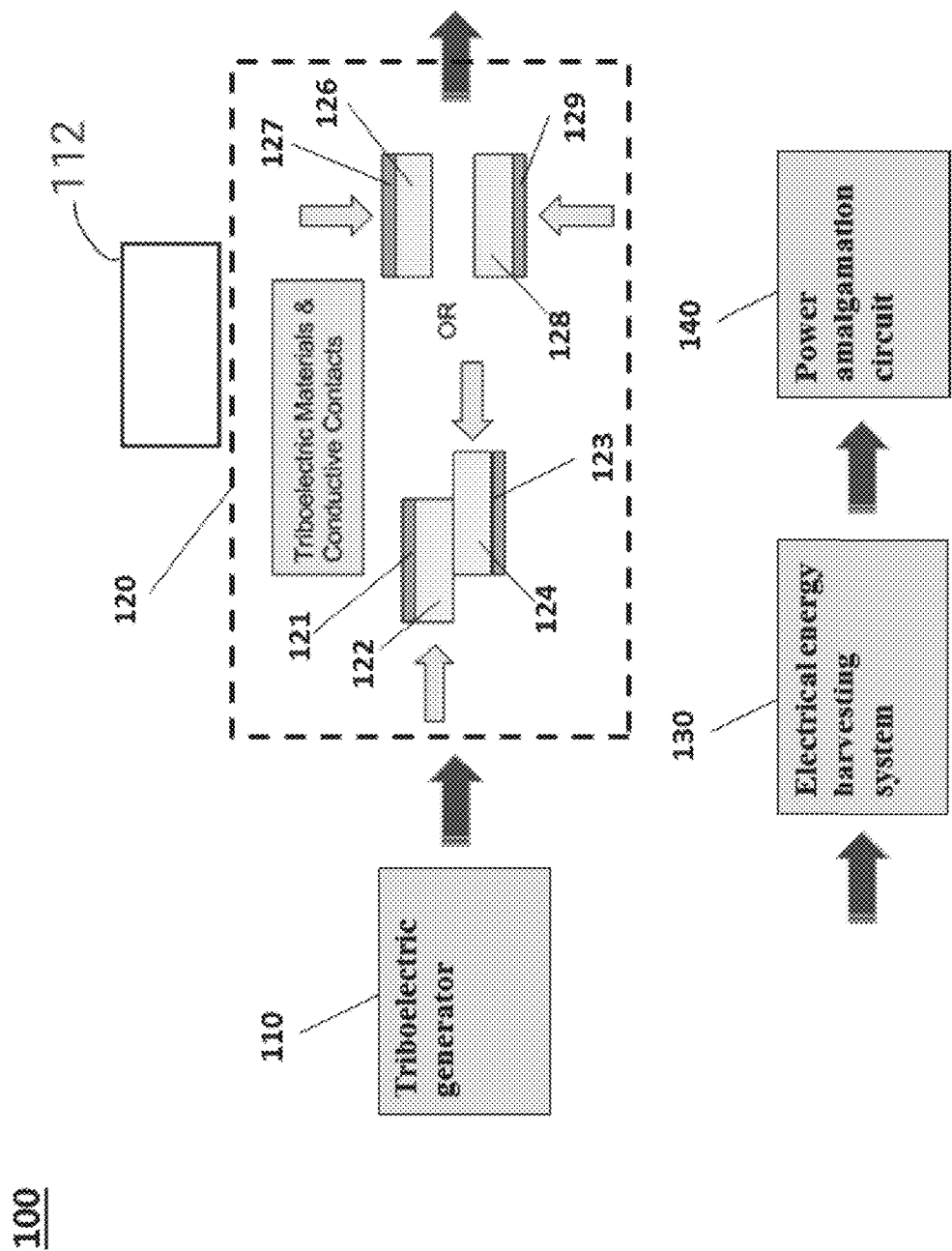
FIG. 1 illustrates a triboelectric energy harvesting system according to some embodiments described herein.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Triboelectric effect can generally refer to a type of contact electrification in which a first contact material becomes electrically charged after coming into frictional contact with a second contact material. Different materials can exhibit different triboelectric properties. To maximize the amount of charge transferred between surfaces, it can be beneficial to utilize one material which tends to lose electrons under friction and another material which tends to accept electrons under friction. "Negatively charged" materials, as used herein, can refer to a material biased to lose electrons under friction. "Positively charged" materials, as used herein, can refer to a material biased to accept electrons under friction.

The systems and methods described herein may enable the harvesting of energy by engaging triboelectically active materials through motion (e.g., translational, rotational, etc.) incurred in response to a pressure exerted by human action or other forces. The other forces may have substantially similar weight to forces involved in human action. Alternatively or in addition, the other forces may have different weight than forces involved in typical human action.

The triboelectrically active materials may harvest energy through the process of contact electrification, wherein the two materials, with different ratings on the triboelectric series, come into contact during the point of maximum displacement and subsequently separate as the materials return to their original positions. During contact, charges may redistribute across the surfaces in contact; after separation, the surfaces may retain a net charge corresponding to the aforementioned redistribution. This separation of charges can establish an electric potential which can then be used to drive current through useful electronics via conductive contacts affixed to the triboelectrically active materials.

The disclosed system and methods may have various benefits. For example, a mechanical motion transformer described herein may directly or indirectly engage a triboelectric generator with one or more input motions. The mechanical motion transformer may be configured to engage the triboelectric materials according to various motions in order to produce a useful electric potential, and return the same materials to their original position. Such configuration may reliably capture and/or filter motions necessary for harvesting energy. Moreover, the disclosed systems and methods describe a fully integrated triboelectric energy harvesting system which may be configured to receive some motion as an input, and transfer the motion to a set of triboelectric materials. As a result of such motion, the system may be configured to produce a useful electric potential which may further drive an energy harvesting circuit. The energy harvesting circuit may be connected to a power amalgamation circuit. The power amalgamation circuit may drive useful electronics or aid in storing energy.

The disclosed systems and methods can enable combinations of several triboelectric generators, thereby combining their power outputs into one, larger, and more useful power output.

FIG. 1 illustrates a fully integrated triboelectric energy harvesting system 100 according to some embodiments described herein. The triboelectric energy harvesting system 100 may comprise a triboelectric generator 110, a mechanical motion transformer (MMT) 112, triboelectric materials and conductive contacts 120, electrical energy harvesting system 130, and power amalgamation circuits 140.

The triboelectric generator 110 may receive a force, such as on one or more surfaces of the triboelectric generator. The force can be exerted by an object. For example, the force exerted by an object can be the weight of an object on the one or more surface of the triboelectric generator. The force exerted by an object can be the kinetic energy of the object in motion (e.g., translational, rotational, etc.). The force exerted by an object can be a combination of weight and/or kinetic energy of the object. In some instances, an object in motion can be set into motion via human input (e.g., pushing, pulling, other manual labor, etc.). For example, an object can be pushed into the triboelectric generator by a human. In some instances, an object in motion can be powered by one or more power generation (or conversion) devices, such as engines (e.g., electrochemical, combustion, electric, internal combustion, turbine, etc.) coupled to one or more motors, drivetrains, or the like. For example, an object can be propelled or driven into the triboelectric generator by an engine. In some instances, the object can be an automobile, such as a vehicle, a car, a truck, a bus, a tank, a motorcycle, a bicycle, a trailer, a board, a scooter, a railcar, a train, an airplane, or any other type of automobile. The object can be a tool. The object can be a wearable device or other clothing (e.g., shoe, sock, watch, etc.) or accessory. The object can be any other object.

Alternatively or in addition, the force can be exerted by a human. For example, the force exerted by a human can be the weight of the human on the one or more surfaces of the triboelectric generator 110. The force exerted by a human can be human motion. The force exerted by a human can be a combination of weight and/or human motion. For example, a human can apply a translational or rotational motion directly to one or more surfaces of the triboelectric generator. In another example, a human can apply a force on the triboelectric generator by stepping on the triboelectric generator.

Alternatively or in addition, the force can be exerted by a surface onto the triboelectric generator 110 (or vice versa). For example, the triboelectric generator can be brought into contact with a surface. The surface can be a road surface, a pavement, or any other surface intended for travel. For example, the surface can be a vertical wall or an inclined hill or a slide or a ramp. The surface can be any other surface. The triboelectric generator, for example, can be pushed into or against a surface (e.g., floor, wall) by an object and/or human.

The triboelectric generator 110 may comprise three components: 1) a mechanical motion transformer (MMT); 2) a set of triboelectric materials; and 3) a set of conductive contacts. The MMT can be a mechanical system comprising an assembly of one or more mechanical components, such as cogs, wheels, drivetrains, stages, pulleys, chains, wheels, and/or other mechanical components. In some instances, the MMT can operate without electrical power input. The MMT may be configured to transfer an input motion (e.g., kinetic energy) to a device and/or one or more of the triboelectric materials. For example, the MMT can transfer an input force received at a first location of the MMT to an output force at a second location of the MMT. The MMT can be configured to transfer an input motion (or momentum) having a first vector to an output motion (or momentum) having a second vector different from the first vector. The MMT may be configured to return a device (e.g., device including a set of triboelectric materials) to its original position. For example, the MMT may be capable of converting translational motion to rotational motion (and vice versa) before engaging the triboelectric materials. The MMT may also be supplemented by additional components, including, but not limited to, electromagnetic induction generators, which can harvest energy directly from various motions without inhibiting the triboelectric energy harvesting.

The triboelectric materials 120 may be triboelectrically active materials. Triboelectrically active materials may comprise, but are not limited to, one or more of the following: polytetrafluoroethylene (PTFE), polydimethylsiloxane (PDMS), polymethyl methacrylate (PMMA), polyvinyl chloride (PVC), fluorinated ethylene propylene (FEP), Kapton, Acrylic, Metals (e.g., copper, aluminum, gold, silver), conductive polymers, indium tin oxide, and other semiconductive materials. These materials may be selected according to their respective ratings on the triboelectric series. Those with different triboeletric ratings, when brought into contact by the MMT, may exchange charges due to the difference in their respective electrochemical potentials. Maximizing this difference can in turn maximize the electric potential achieved upon separation of the materials. The triboelectric generator may comprise at least two such triboelectric materials.

The conductive contacts may comprise metals (e.g., copper, aluminum, gold, silver), conductive polymers, indium tin oxide, or other semiconductive materials. The contacts may serve to transfer the potential difference from the triboelectric materials to one or more external circuitry; this can be done via charge induction between the triboelectric material and the conductive contacts. The contacts can effectively act as terminals (or electrodes) of a circuit. The semiconductors, for example, can afford the triboelectric generator a minimum output threshold in accordance with the material's bandgap. One or more conductive contacts may also function as triboelectric materials. If none of the contacts are triboelectric materials, then the system may comprise an equal number of triboelectric materials and conductive contacts.

As shown in FIG. 1, in one embodiment, in the triboelectric generator 110, a first triboelectric material 122 can be electrically coupled to a first conductive contact 121 and a second triboelectric material 124 can be electrically coupled to a second conductive contact 123. Upon receiving a force on one or more surfaces of the triboelectric generator 110, the MMT can transfer the input force to create frictional contact between the first triboelectric material 122 and the second triboelectric material 124. The frictional contact can result from a shear (or tangential) interaction between the first triboelectric material 122 and the second triboelectric material 124. For example, the MMT can output a force that causes such shear interaction. The frictional contact can be brief. For example, the frictional contact can last at most about 1 minute, 50 seconds, 40 seconds, 30 seconds, 20 seconds, 10 seconds, 9 seconds, 8 seconds, 7 seconds, 6 seconds, 5 seconds, 4 seconds, 3 seconds, 2 seconds, 1 seconds, a tenth of a second, a hundredth of a second, a millisecond, or less. Alternatively, the frictional contact can last for more than about 1 minute.

During contact, charges may redistribute across the surfaces in contact, such as between the contacting surfaces of the first triboelectric material 122 and the second triboelectric material 124. After charge redistribution, the MMT may return the first triboelectric material 122 and the second triboelectric material 124 to their original non-contacting positions, respectively, such that frictional contact is lost. Upon separation, the respective surfaces of the first triboelectric material 122 and the second triboelectric material 124 can retain a net charge corresponding to the aforementioned redistribution. This separation of charges can establish an electric potential which can then be used to drive current through useful electronics via the first conductive contact 121 and the second conductive contact 123. For example, the first conductive contact 121 and the second conductive contact 123 can each act as independent electrodes and/or terminals to an electric circuit.

In another embodiment, a third triboelectric material 126 can be electrically coupled to a third conductive contact 127 and a fourth triboelectric material 128 can be electrically coupled to a fourth conductive contact 129. Upon receiving a force on one or more surfaces of the triboelectric generator 110, the MMT can transfer the input force to create frictional contact between the third triboelectric material 126 and the fourth triboelectric material 128. The frictional contact can result from a non-shear interaction between the third triboelectric material 122 and the second triboelectric material 124, such as an interaction resulting in compression, tension, and/or torsion of one or both triboelectric materials. The frictional contact can be brief. Alternatively, the frictional contact need not be brief.

During contact, charges may redistribute across the surfaces in contact, such as between the contacting surfaces of the third triboelectric material 126 and the fourth triboelectric material 128. After charge redistribution, the MMT may return the third triboelectric material 126 and the fourth triboelectric material 128 to their original non-contacting positions, respectively, such that frictional contact is lost. Upon separation, the respective surfaces of the two triboelectric materials can retain a net charge corresponding to the aforementioned redistribution. This separation of charges can establish an electric potential which can then be used to drive current through useful electronics via the third conductive contact 127 and the fourth conductive contact 129. For example, the third conductive contact 127 and the fourth conductive contact 129 can each act as independent electrodes and/or terminals to an electric circuit.

While the interaction of only two triboelectric materials has been described herein, a triboelectric generator can comprise more than two triboelectric materials, and charge may be redistributed between the respective surfaces of the more than two triboelectric materials. A first triboelectric material may interact with a second triboelectric material from or resulting in shear, compression, tension, normal, and/or torsional forces.

The fully-integrated triboelectric energy harvesting system 100 may also comprise an electrical energy harvesting system 130. Electric potential produced by the triboelectric generator can be used to power an electronic system similar to electronic systems used to harvest energy via piezoelectrics effects. The electrical energy harvesting system 130 may comprise a rectifier, a DC to DC converter, such as but not limited to a buck converter or a buck-boost converter, and/or a battery charging circuit.

The battery charging circuit can offer an energy storage system capable of collecting the intermittent outputs from the triboelectric generator 110 and delivering a steady supply of power to external electronics. The energy storage system can be, for example, a battery, an electrochemical cell, fuel cell, capacitor, supercapacitor, or any other energy storage system. Additionally, a capacitor, supercapacitor, or other such short term electric storage devices can mediate the connection between the triboelectric generator 110 and battery charging circuits to facilitate a more efficient transfer of electrical power to the battery. A control circuit can determine when to charge the short-term storage and when to discharge it into the battery. A control circuit can determine when to power an external device. Charging of the short-term storage can be driven by the triboelectric generator 110. A control circuit can be a microprocessor and/or a microcontroller.

In some embodiments, after a potential is established between the two triboelectrically active materials, a current can begin to flow from a first conductive contact affixed to a first triboelectric material, through the connected harvesting circuit, and into a second conductive contact affixed to a second triboelectric material. In some embodiments, as the current flows through the harvesting circuit, it may, at some point, encounter an AC-to-DC rectifier. Such rectifiers may be included to account for the non-uniformity in the direction of the current observed during the operation of the generator 110.

The electrical energy harvesting system may also comprise a buck converter. In some embodiments, at some point in the harvesting circuit after the rectifier, the current may flow through a buck converter comprising one or more of each of: inductive coils, transistors, and other electrically resistive elements. Such buck converter may be included in the electrical energy harvesting system to compensate for the triboelectric generator's tendency to produce outputs with high potential and low current.

In other embodiments, the electrical energy harvesting system may comprise a Buck-Boost Converter. A buck-boost converter may be used in the case where the generator is determined to produce, in at least some instances, insufficiently low potentials, thereby necessitating a boost in electric potential. The buck-boost converter may comprise one or more of each of: inductive coils, transistors, and electrically resistive elements.

Figure 3:
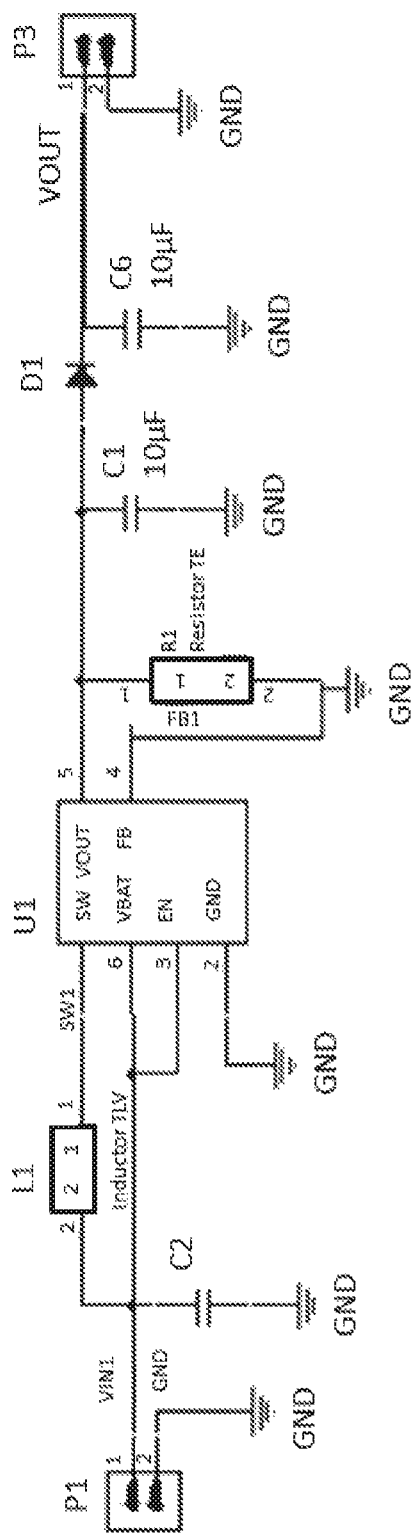
FIG. 3 shows an exemplary circuit for a boost converter, in accordance with embodiments of the invention.

FIG. 3 shows an exemplary circuit for a boost converter (e.g., DC-to-DC power converter), in accordance with embodiments of the invention. For example, in FIG. 3, the power output (e.g., voltage) of an energy generating device P1, such as the triboelectric generator described herein or other type of energy generating device, is boosted to produce the stepped up power output P3. The boost converter may comprise one or more of each of: inductors, transistors, and other electrically resistive elements.

Referring back to FIG. 1, the fully-integrated triboelectric energy harvesting system 100 may further comprise a power amalgamation circuit 140. A plurality of triboelectric generators may be connected through a circuit designed to combine their outputs into one coherent power source. Such power amalgamating circuits can have multiple inputs, each connected to an electrical energy harvesting system 130. Electric power may then be delivered from multiple triboelectric generators to a single power amalgamating circuit. The power amalgamating circuit can have a single output which delivers the power harvested from the multiple generators to external electronics. Examples of external electronics include, but are not limited to LEDs, mobile devices (e.g. laptops, cell phones, etc.), refrigerators, and HVAC units. External electronics may also receive power from other sources including traditional grid-connected sources. In some instances, a triboelectric energy harvesting system can be integrated in a device, and the energy harvested via the triboelectric energy harvesting system can be used to power the same device internally.

Figure 4:
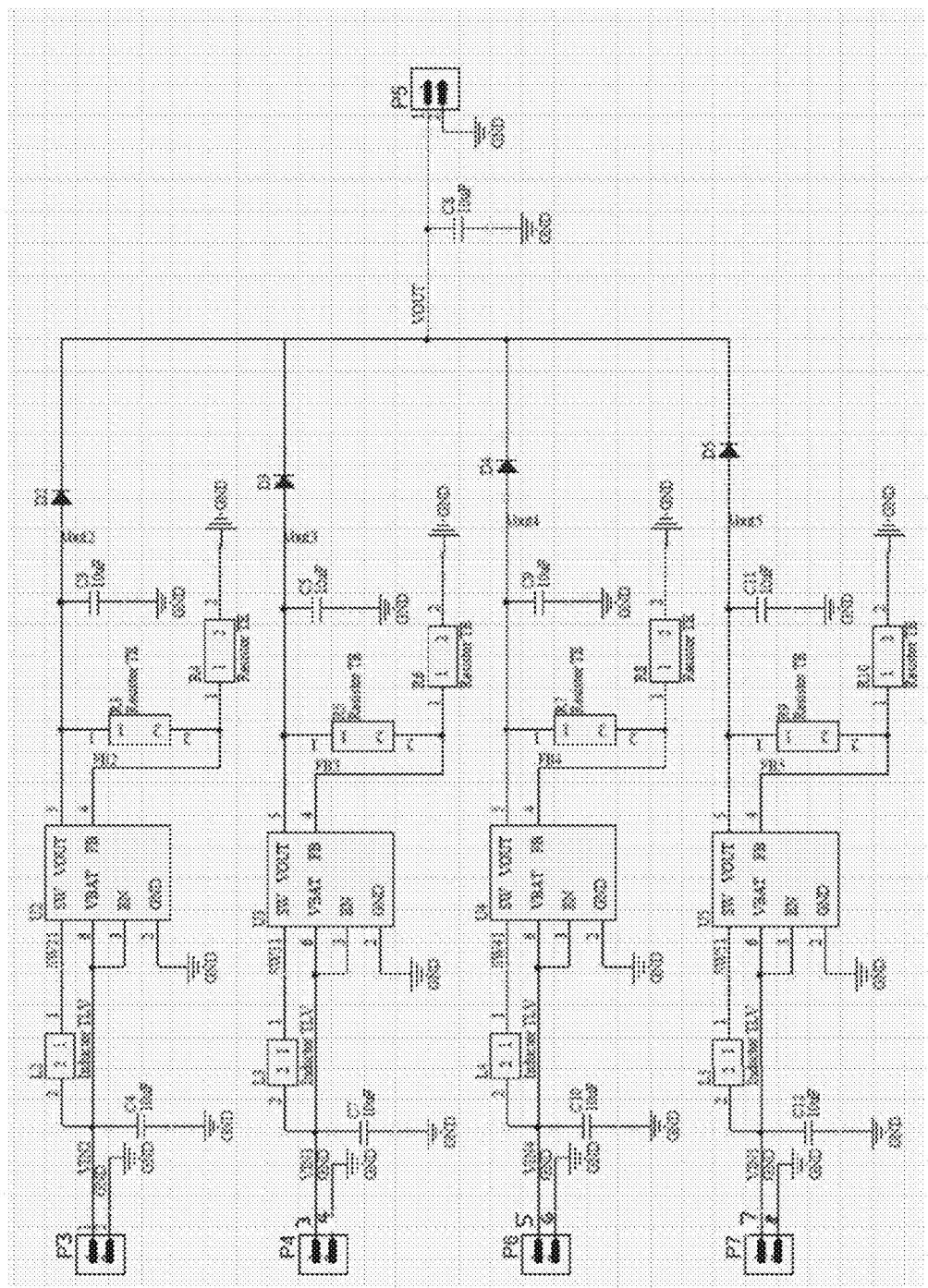
FIG. 4 shows an exemplary amalgamation circuit, in accordance with embodiments of the invention.

FIG. 4 shows an exemplary amalgamation circuit, in accordance with embodiments of the invention. The respective power outputs of a plurality of energy generating devices P2, P4, P6, and P7 (e.g., triboelectric generators) are amalgamated to produce a single power output P5. Each power output of the plurality of energy generating devices P2, P4, P6, and P7 may be boosted (e.g., by parallel boost circuits for each energy generating device) to substantially equal or similar levels to generate the enhanced power output P5. The enhanced power output, for example, may be applied across a load. While FIGS. 3 and 4 show certain circuit configurations for boost converters and/or amalgamation, as will be appreciated, the configurations are not limited as such. For example, the power outputs of the plurality of energy generating devices may be boosted by a single boost circuit instead of a plurality of parallel boost circuits.

Referring back to FIG. 1, the disclosed fully integrated triboelectric energy harvesting system 100 may be incorporated into various other devices or systems. For example, the disclosed energy harvesting system 100 may be incorporated into a floor panel, seat cushion, shoe sole, sidewalk, roadway, or other surface which experiences pressure upon interaction with human motion or other forces (e.g., from objects, such as automobiles). The motion can connect with the surface and the disclosed system 100 can be configured to harvest energy from the motion. The harvested energy may then be delivered to energy storage devices or active electronics using the aforementioned harvesting circuitry and power amalgamating circuit. Examples of such applications include, but are not limited to using the harvested energy to charge a battery or to power an electronic control system containing a processing unit.

The disclosed triboelectric energy harvesting system 100 may also include a flat surface which can serve as a cover to a housing unit containing the triboelectric generator described herein. The triboelectric generator may be attached to the bottom of the flat surface, for example. The cover can engage the MMT under the force of a step (e.g., from a pedestrian) and configured to engage the triboelectric generator.

In another example, the disclosed triboelectric energy harvesting system 100 may also include or be part of a seat cushion. The seat cushion can consist of a compliant material (e.g., leather, fabric, or other textiles). The bottom side of the material can be affixed to the MMT. Under the weight of human interaction or motion, the cushion can be configured to engage the MMT. In another example, a shoe sole (e.g., tennis shoe) can be designed according to a shoemaker's usual specifications but the sole may be modified in one way or another (e.g., hollowed out) to make room for a triboelectric generator and any accompanying components described herein. Under the force of a step or motion, the top of the sole may be configured to engage the MMT underneath. A force can be exerted on one or more triboelectric generators in the shoe sole, such as one or more of compressive, shearing, sliding, rubbing and/or stretching forces when a person wearing the shoe is standing, walking, skipping, jogging, running, and/or generally moving his or her feet.

The disclosed triboelectric energy harvesting system 100 can be integrated into other wearable devices. The wearable device can be any type of clothing, such as shoes (described above), arm bands, clothes, and/or wearable accessories or other wearable devices. Other potential applications of the wearable energy harvesting apparatus include, for example socks rubbing inside a shoe; legs/thighs rubbing against each other creating an electrical differential; arms rubbing against the body; multi-layered clothing that rubs against each other as different layers stretch or compress differently; layered articles of clothing moving relative to one another; compression of a chair, cushion, or bench; sliding motion of multiple layers of material in tents, sleeping bags, car seats, etc.; handbags, backpacks, purses, etc. which experience relative sliding motion; and integration into a measurement sensor for stress, strain, deformation applications.

The triboelectric materials that are selected for integration into a wearable device can be selected to be soft and flexible. For example, a pair of materials which satisfy these conditions and which fall on opposite ends of the triboelectric series is silicone rubber (negatively charged) and nylon (positively charged). Other materials and/or combinations of materials may be used to produce the triboelectric effect via compression, tension, torque, shearing, sliding, rubbing and/or stretching between the two dissimilar materials. In some instances, one or both materials may have a coating to help improve the efficiency of the triboelectric effect. For example, where nylon is used as one of the materials, it may be coated in silver or other metal. Other coating materials may be used. For example, the triboelectric generator can comprise as a first triboelectric material, silver-coated nylon (a fabric), and as a second tribelectrectric material, silicone rubber.

Since the systems, methods, and devices described herein operate through a triboelectric process, which is a surface phenomenon, the area between the contacting surfaces can be maximized to maximize the energy harvested. The triboelectric energy harvesting system can produce a triboelectric voltage when subjected to compressive, shear, sliding, rubbing and/or stretching forces. Other forces may also be applicable in producing the triboelectric effect, and the present invention is not limited to compressive, shear, sliding, rubbing and/or stretching forces. The force may be perpendicular, parallel, or oblique to the surfaces in contact. The two triboelectric materials can be contacted, and a force (e.g., compressive, shear, sliding, rubbing, stretching, etc.) can be applied and subsequently released. Various parameters may be used to optimize or enhance performance of the triboelectric effect upon contact between the two dissimilar materials. Such parameters may include, aside from types of the materials, surface finish (e.g., coating) of the materials, number of layers of the materials, thickness of material layers, patterns of the material layers, and orientations of the material layers.

A triboelectric potential can result in a first instance upon application of a force on the triboelectric generator. A triboelectric potential can result in a second instance upon release of the force from the triboelectric generator. The resulting triboelectric potential can be in short pulses of voltage delivered to the electrical energy harvesting system (e.g., battery charging circuit) and/or power amalgamation circuit. The short pulses of voltage can deliver non-uniform and/or non-unidirectional voltage. For example, for a triboelectric energy harvesting system integrated in a shoe sole and configured to harvest energy from the stepping motion of an adult human, the individual pulses of voltage can vary from about 0.05 volts (V) to about 8.00 V. Alternatively, the voltage can be less than about 0.05 volts or greater than about 8.00 volts.

Figure 2:
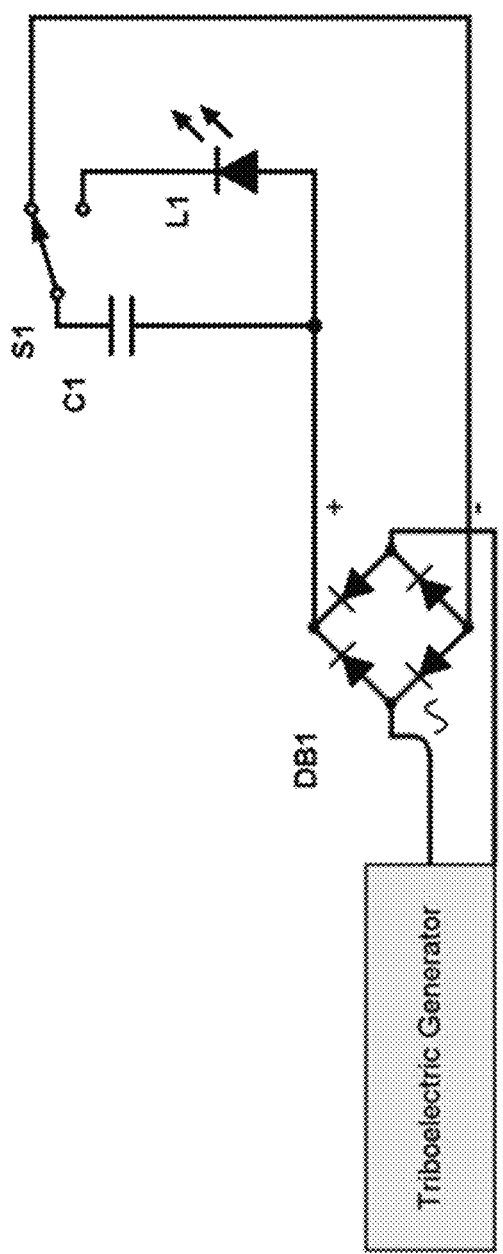
FIG. 2 shows an example of a circuit diagram for a triboelectric energy harvesting system of the present disclosure.

FIG. 2 shows an example of a circuit diagram for a triboelectric energy harvesting system of the present disclosure. The circuit 200 can allow the triboelectric energy harvesting system to efficiently amalgamate power from current which flows in non-uniform direction and from voltages pulsing with varying strength. The triboelectric generator is electrically connected to a diode bridge rectifier DB1, which accepts charge transport in any direction but only passes charge transport in one direction. The diode bridge rectifier DB1 is electrically coupled to a capacitor C1, which temporarily stores the electrical charge delivered to it by the diode bridge. The capacitor C1 is connected to a switch S1. In a first state, the capacitor C1 is connected to the diode bridge DB1 in a complete circuit (e.g., charging circuit); in a second state, the capacitor C1 is connected to another circuit such that the capacitor provides electromotive force to drive the circuit (e.g., load circuit). After the electrical energy has been processed as discussed above, it may then be transmitted to power one or more electric devices.

Other uses may exist for the disclosed triboelectric energy harvesting system 100. The disclosed system may be used to harvest human kinetic energy. The disclosed system and various embodiments can serve to supplement other devices or systems which are, for example, designed for large scale energy harvesting, and also power complementary components therein. For example, a floor panel containing another energy harvesting device may contain a triboelectric generator which powers circuitry accompanying the primary energy harvester. The fully integrated triboelectric energy harvesting system 100 can be integrated into a variety of devices and can have distinct impact on the industry of harvesting kinetic energy.

Beneficially, the integrated triboelectric energy system of the present disclosure may aggregate power generated from a plurality of individual modular triboelectric energy harvesting units. A modular interconnection of the plurality of individual triboelectric energy harvesting units may be accumulated to produce a single larger power output, which may be more practical for use in various electrical needs compared to smaller, and distributed, power outputs. For example, small pockets of power may not be usable or applicable to devices requiring at least a certain threshold amount of power. Modularity can provide other benefits, such as increasing efficiency of energy harvesting. For example, a single motion may exert forces at different locations at different times (e.g., in a walking motion, a force may first be concentrated towards the back of a foot or a shoe and then move towards the front of the foot or the shoe), and a single triboelectric generator may not be able to capture the full extent of kinetic energy (e.g., motion force) concentrated at a different location. Beneficially, a triboelectric generator can be integrated or otherwise installed at a plurality of individual and distinct locations to receive concentrated forces at different points in time and generate power from the different locations (e.g., via separate terminals or electrodes). The individually generated power can be amalgamated to produce a single larger power output.

Beneficially, the triboelectric energy harvesting system can power the device in which the triboelectric energy system is integrated in, obviating the need to rely on batteries or other energy cells (e.g., electrochemical cells) that must be periodically recharged, such as by connecting to a power outlet or electrical grid.

The integrated triboelectric energy system may be portable. The integrated triboelectric energy system may be capable of delivering, on demand, and in real-time, electrical energy to power various devices, including the integrated device and/or one or more external devices electrically communicating with the integrated device. As used herein, real-time can refer to a response time of less than 10 seconds, 1 second, a tenth of a second, a hundredth of a second, a millisecond or less. Alternatively, real-time can be longer than 10 seconds. Real-time can also refer to a substantially simultaneous or parallel process.

As used herein, "or" is inclusive and not exclusive, unless expressly indicated otherwise by context. Therefore, "A or B" means "A, B, or both," unless expressly indicated otherwise or indicated otherwise by context. Moreover, "and" is both joint and several, unless expressly indicated otherwise or indicated otherwise by context.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A triboelectric energy harvesting system, comprising:
   one or more triboelectric generators, each triboelectric generator comprising:

a first triboelectric material and a second triboelectric material configured to (i) at a first state, be electrically isolated from the other, and (ii) at a second state, be in frictional contact with the other;

a first conductive contact electrically coupled to the first triboelectric material and a second conductive contact electrically coupled to the second triboelectric material, wherein the first conductive contact and the second conductive contact are each electrically coupled to a battery charging circuit;

a mechanical motion transformer configured to, upon receipt or release of an input force, alternate the state of the triboelectric material to the second state from the first state or alternate the state of the triboelectric material to the first state from the second state, respectively, wherein said mechanical motion transformer is further configured to transfer an input motion having a first vector to an output motion having a second vector different from the first vector; and an energy storage system electrically coupled to the battery charging circuit, wherein the energy storage system is capable of collecting outputs from the triboelectric generator; and a power amalgamation circuit comprising a plurality of inputs and an output, wherein the plurality of inputs is connected to the respective battery charging circuit of each triboelectric generator, and wherein the output is configured to combine the power from the plurality of inputs.

2. The triboelectric energy harvesting system of claim 1, wherein the first triboelectric material and the second triboelectric material are selected from the group consisting of PTFE, PDMS, PMMA, PVC, FEP, Kapton, Acrylic, Metals, Conductive polymers, and Indium Tin Oxide,
wherein the first triboelectric material is distinct from the second triboelectric material.

3. The triboelectric energy harvesting system of claim 1, wherein the first conductive contact and the second conductive contact are selected from the group consisting of one or more metals, conductive polymers, Indium Tin Oxide, and other semi-conductive materials.

4. The triboelectric energy harvesting system of claim 1, wherein the energy storage system is electrically connected to one or more of a rectifier and a DC to DC converter.

5. The triboelectric energy harvesting system of claim 1, wherein the frictional contact results from shear interaction of the first triboelectric material and the second triboelectric material.

6. The triboelectric energy harvesting system of claim 1, wherein the frictional contact between the first triboelectric material and the second triboelectric material results from one or more of a compressive, tensing, torsional, sliding, rubbing and stretching force.

7. The triboelectric energy harvesting system of claim 1, further comprising an electronic device electrically coupled to the power amalgamation circuit and powered by the combined power.

8. The triboelectric energy harvesting system of claim 7, wherein the electronic device is a wearable device, and wherein the input force is provided by a human wearing the wearable device.

9. The triboelectric energy harvesting system of claim 1, wherein the input force is provided by a human.

10. The triboelectric energy harvesting system of claim 1, wherein at least two of the respective battery charging circuit of each triboelectric generator produces different voltage outputs.

11. A method for harvesting triboelectric energy from a plurality of triboelectric generators, comprising:
(a) integrating a plurality of triboelectric generators into different locations of a device, wherein a given triboelectric generator of the plurality of triboelectric generators comprises
a battery charging circuit,
a first triboelectric material and a second triboelectric material configured to (i) at a first state, be electrically isolated from the other, and (ii) at a second state, be in frictional contact with the other, and
a mechanical motion transformer configured to, upon receipt or release of the input force, alternate the state of the triboelectric material to the second state from the first state or alternate to the first state from the second state, respectively, wherein said mechanical motion transformer is further configured to transfer an input motion having a first vector to an output motion having a second vector different from the first vector;
(b) providing an input force to one or more triboelectric generators from the plurality of triboelectric generators;
(c) upon receipt of the input force, generating, in each of the one or more triboelectric generators, a first pulse of power output at the battery charging circuit of each of the one or more triboelectric generators; and
(d) combining each first pulse of power output, via a power amalgamation circuit, into a first combined output.

12. The method of claim 11, wherein the given triboelectric generator further comprises:
a first conductive contact electrically coupled to the first triboelectric material and a second conductive contact electrically coupled to the second triboelectric material, wherein the first conductive contact and the second conductive contact are each electrically coupled to the battery charging circuit.

13. The method of claim 11, wherein the first triboelectric material and the second triboelectric material are selected from the group consisting of PTFE, PDMS, PMMA, PVC, FEP, Kapton, Acrylic, Metals, Conductive polymers, and Indium Tin Oxide.

14. The method of claim 12, wherein the first conductive contact and the second conductive contact are selected from the group consisting of one or more metals, conductive polymers, Indium Tin Oxide, and other semi-conductive materials.

15. The method of claim 11, wherein the battery charging circuit comprises one or more of a rectifier and a DC to DC converter.

16. The method of claim 15, wherein the DC to DC converter is a buck converter or a buck-boost converter.

17. The method of claim 11, further comprising powering an electronic device electrically coupled to the power amalgamation circuit.

18. The method of claim 17, wherein the electronic device is the device.

19. The method of claim 11, further comprising:
(e) releasing the input force from the one or more triboelectric generators;
(f) upon release of the input force, generating, in each of the one or more triboelectric generators, a second pulse of power output at the battery charging circuit of each of the one or more triboelectric generators; and (g) combining each second pulse of power output, via the power amalgamation circuit, into a second combined output.

20. The method of claim 18, further comprising storing the first combined output and the second combined output in an energy storage system electrically coupled to the power amalgamation circuit.

* * * * *